Patented Feb. 10, 1925.

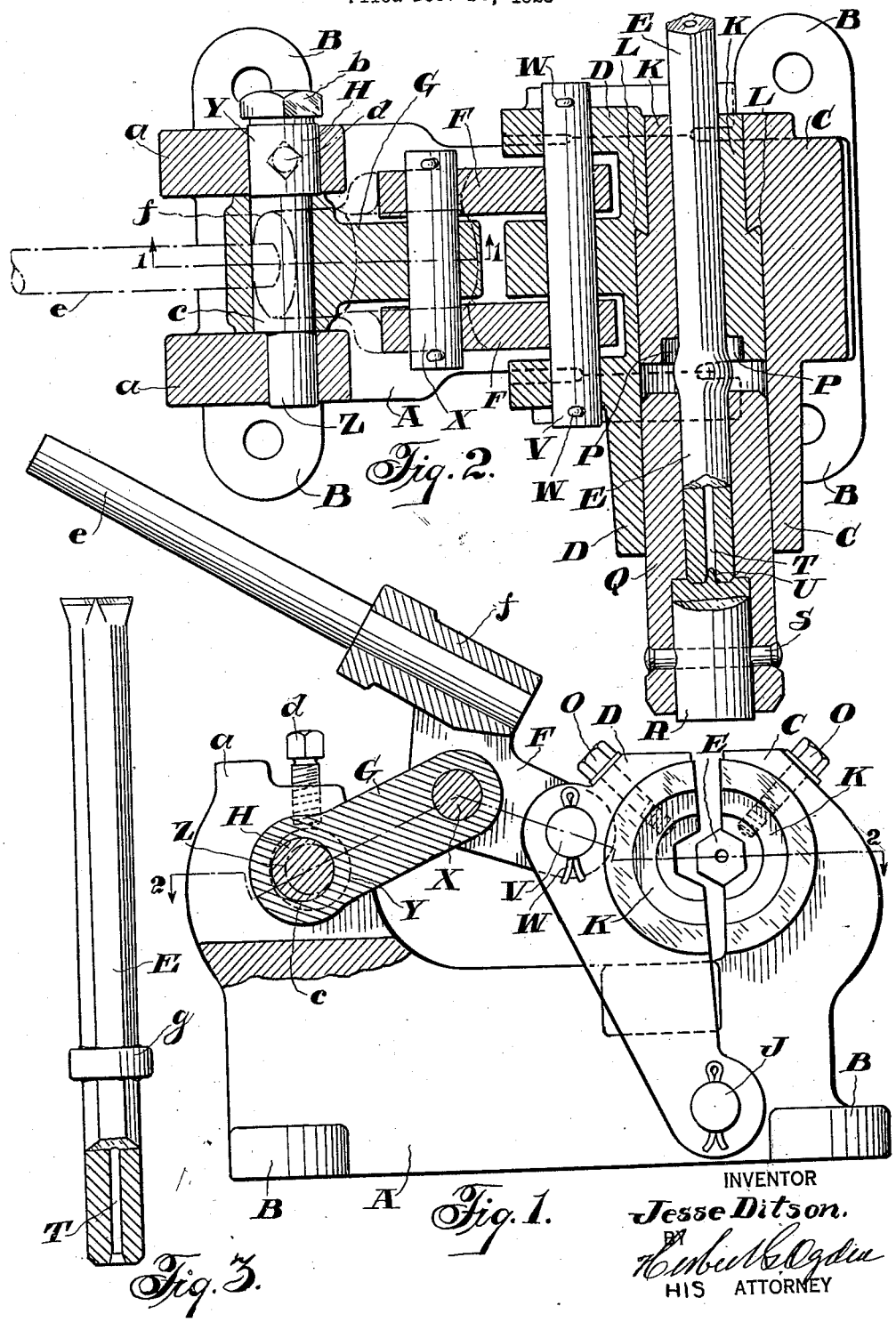

1,526,055

UNITED STATES PATENT OFFICE.

JESSE DITSON, OF LITTLETON, COLORADO, ASSIGNOR TO INGERSOLL-RAND COMPANY, OF JERSEY CITY, NEW JERSEY, A CORPORATION OF NEW JERSEY.

DEVICE FOR FORMING SHANKS AND COLLARS ON DRILL STEELS.

Application filed December 14 1923. Serial No. 680,686.

*To all whom it may concern:*

Be it known that I, JESSE DITSON, a citizen of the United States, and a resident of Littleton, county of Arapahoe, and State of Colorado, have invented a certain Device for Forming Shanks and Collars on Drill Steels, of which the following is a specification accompanied by drawings.

This invention relates to devices for forming collars on the shanks of drill steels and the like.

Devices of this type are particularly adapted for forming the collars on drill steels by means of which the steel is retained in the front head of the drill. The usual practice of forming these collars is by pneumatically operated machines which are adapted for use in cases in which a great deal of this work is done. However, in case a steel is broken while in use at a mine or quarry or at a distance from the machine of the type described, it becomes a matter of great convenience to have a smaller hand tool for forming collars on such steels, which may be used in any blacksmith shop and is portable and inexpensive.

It is accordingly among the objects of this invention to enable the shanks of the drill steels to be formed with collars of the proper size and shape in the field by a light portable and inexpensive machine which is provided with suitable adjustments and renewable parts.

Other objects will be apparent from the following description taken in conjunction with the drawings illustrating a practical embodiment of this invention and in which—

Figure 1 is a side elevation of the hand shanking device partly in vertical section, Figure 2 is a horizontal sectional view on the line 2—2 of Figure 1, and Figure 3 is an illustration of one form of shank which is desired to be formed on a drill steel.

Referring to the drawings, and more particularly to Figures 1 and 2, the machine comprises a base A, having suitable apertured lugs B, by which the machine may be fastened to a support. At one end of the base, a pair of relatively movable jaws C and D are mounted on the base for clamping the shank of the drill steel, indicated at E therebetween, and a toggle comprising a pair of links F and G is provided for forcing the jaws C and D together, one of the links being provided with an adjustable eccentric bearing H so that the jaws may be adjusted with respect to each other.

Preferably one of the jaws, as for instance C, is fixed being made integral with the base A, and the other jaw D is provided with a forked end pivoted by means of suitable gudgeons J on the base A. Each of the jaws is provided with a clamping die K of hardened steel and removable from the jaws so that the jaws may be fitted with various sizes and forms of dies to grip a variety of drill steels. As shown in the drawings, the dies in this instance are adapted to grip a hexagonal drill steel. They may, however, be made to fit a round shank or any other desired cross section. The dies are held by means of shoulders L, and cap screws O extending through the jaws into the dies. At one end the dies are recessed or provided with forming portions P, corresponding to the shape of the collar which it is desired to form on the drill steel shank. The dies K are shorter than the length of the jaws C and D, leaving a substantial length of the jaws free to receive a plunger Q provided with a hole extending longitudinally and centrally of the plunger and of the same form as the shank of the drill steel to be operated upon. The plunger Q is counterbored at the end which is adapted to protrude from between the jaws and within the aperture so formed there is inserted a plug R held in place by a pin S.

The plunger Q is intended to be slipped over the end of the drill steel shank, as shown in Figure 2, and in the manner hereinafter described, the plug R is intended to properly shape the end of the drill steel and to maintain the hole T of the drill steel open and central. To this end the plug R is provided with a projection U which is normally in alignment with the central hole of the drill steel and furthermore, if the central hole T of the steel is out of proper alignment, or off center, the projection U will center it. In this manner the central hole is assured of proper alignment with the water feed apparatus of the drill into which the shank of the drill steel is to be inserted.

The links F and G are provided for the purpose of moving the jaw D toward the stationary jaw C and holding it there forcibly. A pin V forms a pivotal connection between the link F and the movable jaw D and is held in place by suitable fastening means, as cotter pins W. At the connection between the link F and the link G, the point at which the actuating power is applied, there is provided a connecting pin X passing through the forked portion of the link F and the link G. The other end of the link G is preferably mounted on the base by means of the eccentric bearing H, which is provided with two concentric portions Y and Z, rotatable for adjustment in the upwardly extending portions $a$ of the base A by means of a squared head $b$. The central portion $c$ of the bearing H forming the bearing for the link G is eccentric to the portions Y and Z, so that upon rotation of the bearing by means of the head $b$ the distance between the pivotal point of the link G and the jaw C is adjustable. In this manner the toggle and jaws C and D are adjustable with respect to each other. The bearing H is held stationary by means of a set screw $d$.

The toggle is operable by suitable means such as a hand lever $e$ fitting into a suitable extension $f$ on the link F. Thus when it is desired to force the jaws C and D together, the lever $e$ is pressed downwardly and the toggle is straightened out to force the jaws together, and on the shank of the drill steel E.

In operating the device to form a collar $g$ on the shank of the drill steel E, the plunger Q alone removed from the machine is placed upright on the ground or on a plank and the heated drill steel is dropped into the same and tapped with a hammer to make sure that the steel bottoms correctly. The plunger and steel are then dropped into place between the clamping dies K of the machine leaving the end of the plunger Q projecting about one inch or a distance previously determined by calculation depending upon the length of the shank desired. The steel is clamped rigidly by depressing the lever $e$. In this manner the jaws C and D grip the steel tightly and while held in this position the end of the plunger Q or the projecting end of the plug R is tapped with a heavy sledge to drive it in between the encircling ends of the jaws C and D. Six or seven blows of a heavy sledge usually suffice to up-set the collar in the orifice formed by the recesses P in the clamping dies K. The plunger Q may be removed from the steel by pulling or tapping with a hammer. The entire machine above described may be made light in weight without impairing its strength and it is readily portable from place to place, not being bulky. The parts may easily be replaced when worn, and by means of the eccentric bearing H adjustment may be made to compensate for wear or variation in size of drill steels.

It is understood that the construction above described is merely one embodiment of the invention, and that various modifications may be devised without departing from the spirit of the invention, the scope thereof being indicated in the following claims.

I claim:

1. A drill steel shanking device comprising in combination, a base, a pair of clamping jaws mounted on said base, one of said jaws being fixed, a toggle mounted on said base to actuate said movable jaws including a pair of links, one of which is provided with a lever rigidly attached thereto adapted to be manually actuated, and an adjustable bearing on said base for one of said links to adjust said movable jaw with respect to said fixed jaw.

2. A drill steel shanking device comprising in combination, a base, a pair of clamping jaws mounted on said base, one of said jaws being fixed, a toggle mounted on said base to actuate said movable jaw including a pair of links, a manually operable lever rigidly mounted on one of said links for operating said toggle, and an eccentric bearing on said base for one of said links to adjust said movable jaw with respect to said fixed jaw.

3. A drill steel shanking device comprising in combination, a base, a pair of clamping jaws mounted on said base, one of said jaws being movable toward and away from the other, a toggle mounted on said base to actuate said movable jaw including a pair of links, a manually operable lever mounted on one of said links for operating said toggle, and an eccentric bearing on said base for one of said links to adjust said movable jaw with respect to the fixed jaw, a clamping die bolted in each of said jaws, said dies being recessed at one end corresponding to the form of a collar to be upset on said drill steel shank, and a plunger adapted to fit over the end of said drill steel insertable between said jaws in their clamped position and extending beyond the end thereof, and a plug within said plunger having a projection extending centrally to align and open the bore of the said drill steel.

In testimony whereof I have signed this specification.

JESSE DITSON.